(12) United States Patent
Honjo et al.

(10) Patent No.: US 11,275,383 B2
(45) Date of Patent: Mar. 15, 2022

(54) CONTROL DEVICE, LENS DEVICE, IMAGING DEVICE, IMAGING SYSTEM, MOVABLE OBJECT CONTROL METHOD, AND PROGRAM

(71) Applicant: SZ DJI TECHNOLOGY CO., LTD., Shenzhen (CN)

(72) Inventors: Kenichi Honjo, Tokyo (JP); Yongwang Xu, Tokyo (JP)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 294 days.

(21) Appl. No.: 16/561,381

(22) Filed: Sep. 5, 2019

(65) Prior Publication Data

US 2019/0391591 A1 Dec. 26, 2019

Related U.S. Application Data

(63) Continuation of application No. PCT/JP2017/009075, filed on Mar. 7, 2017.

(51) Int. Cl.
| | |
|---|---|
| *G05D 1/02* | (2020.01) |
| *B64C 39/02* | (2006.01) |
| *G05D 1/00* | (2006.01) |
| *G05D 1/04* | (2006.01) |
| *G05D 1/08* | (2006.01) |

(52) U.S. Cl.
CPC ......... *G05D 1/0242* (2013.01); *B64C 39/024* (2013.01); *G05D 1/0022* (2013.01); *G05D 1/0094* (2013.01); *G05D 1/042* (2013.01); *G05D 1/085* (2013.01); *B64C 2201/146* (2013.01)

(58) Field of Classification Search
None
See application file for complete search history.

(56) References Cited

U.S. PATENT DOCUMENTS

| | | | | |
|---|---|---|---|---|
| 3,783,614 | A | * | 1/1974 | Walker .................... F01D 25/08 60/39.181 |
| 4,313,726 | A | * | 2/1982 | Chase .................... G09B 9/302 434/42 |
| 4,638,960 | A | * | 1/1987 | Straube .............. G05D 23/2401 219/497 |

(Continued)

FOREIGN PATENT DOCUMENTS

| | | | | | |
|---|---|---|---|---|---|
| CN | 103488031 | A | * | 1/2014 | |
| FR | 2999534 | A1 | * | 6/2014 | ............. B64D 15/20 |

(Continued)

OTHER PUBLICATIONS

The World Intellectual Property Organization (WIPO) International Search Report for PCT/JP2017/009075 dated Jun. 6, 2017 5 pages.

*Primary Examiner* — Jeff A Burke
*Assistant Examiner* — Arslan Azhar
(74) *Attorney, Agent, or Firm* — Anova Law Group, PLLC

(57) ABSTRACT

A control device includes control circuitry configured to control a heating device to heat an optical member in response to instruction information fulfilling a predetermined condition. The instruction information causes an increase in altitude of a movable object. The movable object includes an imaging device that includes an image sensor, the optical member, and the heating device. The optical member is arranged in front of the image sensor.

19 Claims, 8 Drawing Sheets

(56) References Cited

U.S. PATENT DOCUMENTS

| | | | |
|---|---|---|---|
| 9,658,006 B1* | 5/2017 | Bruns | B64B 1/40 |
| 10,315,777 B2* | 6/2019 | Martins | G05D 1/0083 |
| 2015/0210399 A1* | 7/2015 | Cox | B64D 15/12 |
| | | | 244/50 |
| 2015/0274309 A1* | 10/2015 | Shi | G05D 1/042 |
| | | | 244/63 |
| 2016/0311542 A1* | 10/2016 | Mackin | B64D 15/12 |

FOREIGN PATENT DOCUMENTS

| | | |
|---|---|---|
| JP | 2006000282 A | 1/2006 |
| JP | 2009133895 A | 6/2009 |
| JP | 2010530830 A | 9/2010 |
| JP | 2012028974 A | 2/2012 |
| JP | 2017501926 A | 1/2017 |
| JP | 6090407 B1 | 3/2017 |

\* cited by examiner

CONTROL DEVICE, LENS DEVICE, IMAGING DEVICE, IMAGING SYSTEM, MOVABLE OBJECT CONTROL METHOD, AND PROGRAM

CROSS-REFERENCE TO RELATED APPLICATION

This application is a continuation of International Application No. PCT/JP2017/009075, filed Mar. 7, 2017, the entire content of which is incorporated herein by reference.

FIELD

The disclosed embodiments relate to a control device, lens device, an imaging device, an imaging system, a movable object, a control method, and a program.

BACKGROUND

Japanese Unexamined Publication No. 2006-000282 discloses an endoscope clouding prevention method in which a temperature sensor detects the temperature of a cover glass that is provided in front of an object lens; the cover glass is heated by controlling a heater based on the detected temperature; and the temperature of the cover glass is kept constant at a predefined set temperature.

Patent Literature 1 Japanese Unexamined Publication No. 2006-000282

When a device for preventing clouding of an optical member such as a cover glass is employed in an environment that is subject to significant changes in temperature, control over heating the optical member may be insufficient and adequate prevention of clouding of the optical member may be impossible.

A control device according to one aspect of the present disclosure can include a control unit for controlling a heating unit for heating an optical member that is provided in front of an image sensor. The control unit can cause the heating unit to heat the optical member when instruction information fulfills a predetermined condition, the instruction information causing an increase in altitude of a movable object that is provided with an imaging device that includes the image sensor, the optical member, and the heating unit.

The instruction information can indicate the altitude at which the movable object is to be positioned. The movable object can move so as to be positioned at the altitude indicated by the instruction information. The predetermined condition can be a condition that the altitude indicated by the instruction information be at or in excess of a predetermined threshold value.

The instruction information can include an ascent command for causing the movable object to ascend. The movable object can ascend as long as the ascent command is being received. The predetermined condition can be a condition that the movable object continuously receive the ascent command for a predetermined period of time or more.

The control unit can control the heating unit further based on height information for the movable object.

After the control unit begins heating the optical member with the heating unit, the heating control unit can cause the heating unit to stop heating the optical member when: the instruction information does not satisfy the predetermined condition; and the difference between the predetermined height and the height of the movable object, as indicated by the height information, is within a predetermined tolerance.

The height indicated by the height information can indicate the altitude of the movable object. After the control unit begins heating the optical member with the heating unit, the control unit can cause the heating unit to stop heating the optical member when: the instruction information does not satisfy the predetermined condition; and the difference between the predetermined altitude and the altitude of the movable object, as indicated by the height information, is within a predetermined tolerance.

The predetermined altitude can correspond to the altitude of the movable object prior to the movable object beginning ascent based on the instruction information.

The height indicated by the height information can indicate the air pressure around the movable object. After the control unit begins heating the optical member with the heating unit, the control unit can cause the heating unit to stop heating the optical member when: the instruction information does not satisfy the predetermined condition; and the difference between the predetermined air pressure and the air pressure around the movable object, as indicated by the height information, is within a predetermined tolerance.

The predetermined air pressure can correspond to the air pressure around the movable object prior to the movable object beginning ascent based on the instruction information.

The control unit can control the heating unit further based on temperature information indicating the temperature around the movable object.

After the control unit begins heating the optical member with the heating unit, the control unit can cause the heating unit to stop heating the optical member when: the instruction information does not satisfy the predetermined condition; and the difference between the predetermined temperature and the temperature around the movable object, as indicated by the temperature information, is within a predetermined tolerance.

The predetermined temperature can correspond to the temperature around the movable object prior to the movable object beginning ascent based on the instruction information.

The imaging device can include at least one lens provided between the optical member and the image sensor. The optical member can be a cover covering an area in front of the at least one lens.

A lens device according to another aspect of the present disclosure can include the control device. The lens device can include the optical member. The lens device can include at least one lens covered in front by the optical member. The lens device can include the heating unit.

An imaging device according to another aspect of the present disclosure can include the lens device. The imaging device can include the image sensor.

An imaging system according to another aspect of the present disclosure can include the imaging device. The imaging system can include a carrier for supporting the imaging device.

A movable object according to another aspect of the present disclosure can include the imaging system.

A control method according to another aspect of the present disclosure can be a control method for controlling a heating unit for heating an optical member that is provided in front of an image sensor. The control method can include causing the heating unit to heat the optical member when instruction information fulfills a predetermined condition, the instruction information causing an increase in altitude of a movable object that is provided with an imaging device that includes the image sensor, the optical member, and the heating unit.

A program according to another aspect of the present disclosure can be a program for causing a computer to function as a control unit for controlling a heating unit for heating an optical member that is provided in front of an image sensor. The control unit can cause the heating unit to heat the optical member when instruction information fulfills a predetermined condition, the instruction information causing an increase in altitude of a movable object that is provided with an imaging device that includes the image sensor, the optical member, and the heating unit.

According to the aspects described above, insufficiency of control over heating an optical member and inadequate prevention of clouding of the optical member can be prevented.

The features described above can also be arranged into a variety of sub-combinations.

DETAILED DESCRIPTION OF THE EMBODIMENTS

Figure 1:
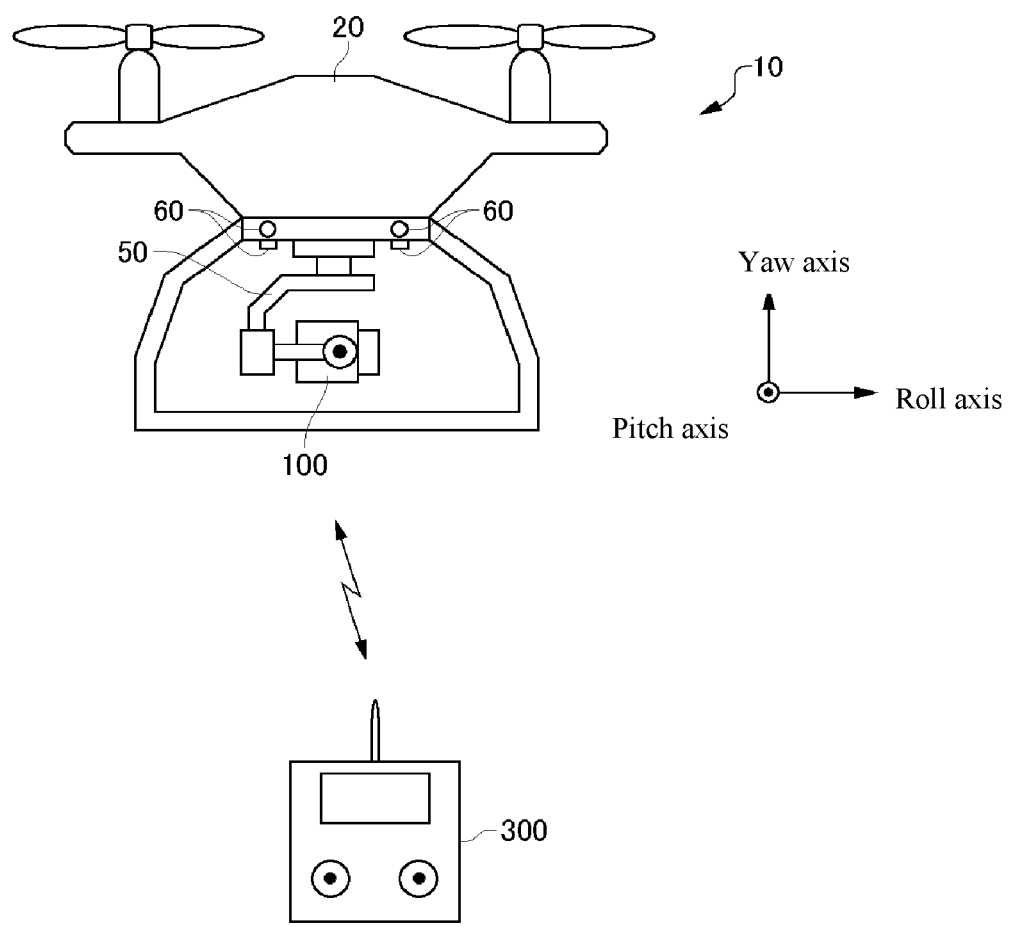
FIG. 1 illustrates one example of an exterior of an unmanned aerial vehicle and a remote control device.

The present disclosure is described below using some embodiments of the disclosure, but the embodiments below do not limit the disclosure according to the scope of the claims. Not all combinations of features described in the embodiments are necessary to achieve the disclosure. It should be clear to a person skilled in the art that the following embodiments are open to various modifications or improvements. It should also be clear from the scope of the claims that forms having such modifications or improvements can be included in the technical scope of the present disclosure.

The scope of the claims, specification, drawings, and abstract include matters subject to protection by copyright. The owner of copyright does not raise objections to duplication by any person of these documents if it is as displayed in the files or records of the Patent Office.

However, in all other cases, all copyrights are reserved.

The various embodiments of the present disclosure can be described referencing flowcharts and block diagrams. In such depictions, the blocks can illustrate (1) a step of a process that executes an operation, or (2) a "unit" of a device having a role in executing an operation. A specific step or "unit" can be implemented through a programmable circuit and/or a processor. A dedicated circuit can include a digital and/or analog hardware circuit. An integrated circuit (IC) and/or discrete circuit can be included. A programmable circuit can include a reconfigurable hardware circuit. The reconfigurable hardware circuit can include a memory element, such as a logical AND, logical OR, logical XOR, logical NAND, logical NOR, and other logical operations; a flip-flop; a register; a field programmable gate array (FPGA); and a programmable logic array (PLA).

A computer-readable medium can include any tangible device that can store instructions to be executed by a suitable device. As a result, a computer-readable medium having instructions stored thereon can include a manufactured good that includes instructions that can be executed to create means for executing operations designated in a flowchart or a block diagram. As for examples of computer-readable media, electronic recording media, magnetic recording media, optical recording media, electromagnetic recording media, semiconductor recording media, and the like can be included. As for more specific examples of computer-readable media, floppy discs®, diskettes, hard discs, random access memory (RAM), read-only memory (ROM), erasable programmable read-only memory (EPROM or flash memory), electrically erasable programmable read-only memory (EEPROM), static random access memory (SRAM), compact disc read-only memory (CD-ROM), digital versatile disc (DVD), Blu-ray® discs, memory sticks, integrated circuit cards, and the like can be included.

Computer-readable instructions can include either source code or object code written in any combination of one or more programming languages. The source code or object code can include a conventional procedural programming language. The conventional procedural programming language can be: assembler instructions; instruction set architecture (ISA) instructions; machine instructions; machine-dependent instructions; microcode; firmware instructions; state setting data; an object-oriented programming language such as Smalltalk, JAVA®, C++, or the like; "C" programming language; or a similar programming language. The computer-readable instructions can be provided to a processor or programmable circuit of a general-purpose computer, a special-purpose computer, or another programmable data processing device either locally or via a local area network (LAN) or a wide area network (WAN) such as the Internet. The processor or programmable circuit can execute computer-readable instructions in order to create means for executing the operations designated in a flowchart or block diagram. Examples of a processor can include a computer processor, a processing unit, a microprocessor, a digital signal processor, a controller, a microcontroller, and the like.

FIG. 1 illustrates one example of an exterior of an unmanned aerial vehicle (UAV) 10 and a remote control device 300. The UAV 10 can include a UAV body 20, a gimbal 50, a plurality of imaging devices 60, and an imaging device 100. The gimbal 50 and the imaging device 100 are one example of an imaging system. The UAV 10 is one example of a movable object propelled by a propulsion unit. The movable object can be a concept that includes, in addition to UAVs, other aerial vehicles moving in the air, vehicles moving on the ground, ships moving in the water, and the like.

The UAV body 20 can include a plurality of rotary wings. The plurality of rotary wings can be one example of a propulsion unit. The UAV body 20 can cause the UAV 10 to fly by controlling the rotation of the plurality of rotary wings. For example, the UAV body 20 can cause the UAV 10 to fly by using four rotary wings. The number of rotary wings is not limited to four. Also, the UAV 10 can be a fixed-wing aircraft that does not have rotary wings.

The imaging device 100 can be a camera for imaging that images a subject contained in a desired imaging range. The gimbal 50 can rotatably support the imaging device 100. The gimbal 50 is one example of a carrier. For example, the gimbal 50 can rotatably support the imaging device 100 on a pitch axis using an actuator. Using actuators, the gimbal 50 can further rotatably support the imaging device 100 with the roll axis and the yaw axis each at the center. The gimbal 50 can change an orientation of the imaging device 100 by rotating the imaging device 100 with at least one of the yaw axis, the pitch axis, and the roll axis at the center.

The plurality of imaging devices 60 can be cameras for sensing, which image the surroundings of the UAV 10 in order to controlling the flight of the UAV 10. Two imaging devices 60 can be provided on a front face, which is the nose of the UAV 10. Further, another two imaging devices 60 can be provided on a bottom face of the UAV 10. The two imaging devices 60 on the front face side can act as a pair and function as what is known as a stereo camera. The two imaging devices 60 on the bottom face side can also act as a pair and function as a stereo camera. Three-dimensional spatial data of the surroundings of the UAV 10 can be generated based on the images imaged by the plurality of imaging devices 60. The number of imaging devices 60 provided on the UAV 10 is not limited to four. The UAV 10 can include at least one imaging device 60. The UAV 10 can include at least one imaging device 60 on each of the nose, tail, sides, bottom surface, and upper surface of the UAV 10. An angle of view that can be set on the imaging devices 60 can be wider than an angle of view that can be set on the imaging device 100. The imaging devices 60 can have a single focus lens or a fisheye lens.

The remote control device 300 can communicate with the UAV 10 and can remotely control the UAV 10. The remote control device 300 can communicate with the UAV 10 wirelessly. The remote control device 300 can transmit instruction information to the UAV 10 indicating various commands relating to movement of the UAV 10, such as ascent, descent, acceleration, deceleration, forward movement, backward movement, rotation, or the like. The instruction information can include instruction information for increasing the altitude of the UAV 10, for example. The instruction information can indicate the altitude at which the UAV 10 is to be positioned. The UAV 10 can move so as to be positioned at the altitude indicated by the instruction information received from the remote control device 300. The instruction information can include an ascent command for causing the UAV 10 to ascend. The UAV 10 can ascend as long as the ascent command is being received. When the altitude of the UAV 10 reaches an upper limit altitude, the UAV 10 can limit the ascent even when the ascent command is still being received.

Figure 2:
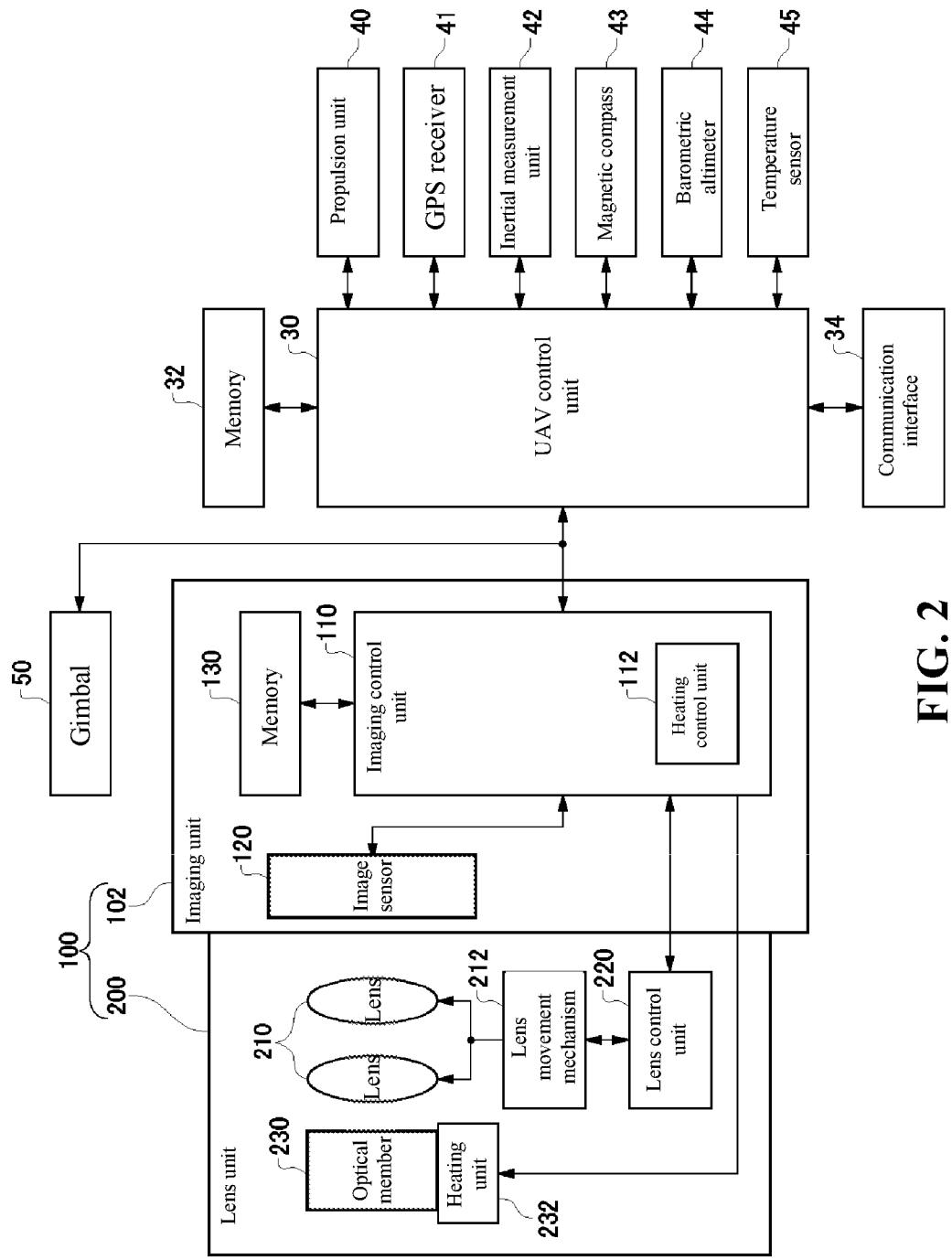
FIG. 2 illustrates one example of an unmanned aerial vehicle function block.

FIG. 2 illustrates one example of a function block of the UAV 10. The UAV 10 can include a UAV control unit 30, a memory 32, a communication interface 34, a propulsion unit 40, a GPS receiver 41, an inertial measurement unit 42, a magnetic compass 43, a barometric altimeter 44, a temperature sensor 45, the gimbal 50, and the imaging device 100.

The communication interface 34 can communicate with other devices, such as the remote control device 300. From the remote control device 300, the communication interface 34 can receive instruction information that includes a variety of instructions for the UAV control unit 30. The memory 32 can store programs and the like necessary for the UAV control unit 30 to control the propulsion unit 40, the GPS receiver 41, the inertial measurement unit (IMU) 42, the magnetic compass 43, the barometric altimeter 44, the temperature sensor 45, the gimbal 50, the imaging devices 60, and the imaging device 100. The memory 32 can be a recordable medium that is computer-readable, and can include at least one from among SRAM, DRAM, EPROM, EEPROM, and flash memory such as USB memory. The memory 32 can be provided inside the UAV body 20. The memory 32 can be provided such that it is detachable from the UAV body 20.

The UAV control unit 30 can control the flight and imaging of the UAV 10 by following a program stored in the memory 32. The UAV control unit 30 can be configured from a microprocessor such as a CPU or MPU, a microcontroller such as an MCU, or the like. The UAV control unit 30 can control the flight and imaging of the UAV 10 by following instructions received from the remote control device 300 via the communication interface 34. The propulsion unit 40 can propel the UAV 10. The propulsion unit 40 can have a plurality of rotary wings and a plurality of drive motors for rotating the plurality of rotary wings. The propulsion unit 40 can cause the UAV 10 to fly by rotating the plurality of rotary wings via the plurality of drive motors, following the instructions from the UAV control unit 30.

The GPS receiver 41 can receive a plurality of signals indicating the time at which the signals were transmitted from a plurality of GPS satellites. The GPS receiver 41 can calculate the position of the GPS receiver 41 (that is, the position of the UAV 10) based on the plurality of signals received. The IMU 42 can detect the attitude of the UAV 10. The IMU 42 can detect acceleration of the UAV 10 in three axial directions (forward/backward, right/left, and up/down) and angular velocity in three axial directions (pitch, roll, and yaw) to represent the attitude of the UAV 10. The magnetic compass 43 can detect the bearing of the nose of the UAV 10. The barometric altimeter 44 can detect the altitude at which the UAV 10 is flying. The barometric altimeter 44 can detect the altitude by detecting the air pressure around the UAV 10 and converting the detected air pressure to altitude. The temperature sensor 45 can detect the temperature around the UAV 10.

The imaging device 100 can include an imaging unit 102 and a lens unit 200. The lens unit 200 is one example of a lens device. The imaging unit 102 can include an image sensor 120, an imaging control unit 110, and a memory 130. The image sensor 120 can be configured from CCD or CMOS. The image sensor 120 can output to the imaging control unit 110 image data of an optical image formed via a plurality of lenses 210. The imaging control unit 110 can be configured from a microprocessor such as a CPU or MPU, a microcontroller such as an MCU, or the like. The imaging control unit 110 can control the imaging device 100 according to action instructions for the imaging device 100 provided from the UAV control unit 30. The memory 130 can be a computer-readable recording medium, and can include at least one from among SRAM, DRAM, EPROM, EEPROM, and flash memory such as USB memory. The memory 130 can store programs and the like necessary for the imaging control unit 110 to control the image sensor 120 and the like. The memory 130 can be provided in the interior of a housing of the imaging device 100. The memory 130 can be provided such that it is removable from the housing of the imaging device 100.

The lens device 200 can include the plurality of lenses 210, a lens movement mechanism 212, a lens control unit 220, an optical member 230, and a heating unit 232. The plurality of lenses 210 can function as a zoom lens, a varifocal lens, and a focus lens. At least one, or all, of the plurality of lenses 210 can be disposed movably along an optical axis. The lens unit 200 can be an interchangeable lens provided such that the lens unit 200 can be attached to or removed from the imaging unit 102. The lens movement mechanism 212 can move at least one, or all, of the plurality of lenses 210 along the optical axis. Following lens control instructions from the imaging unit 102, the lens control unit 220 can drive the lens movement mechanism 212 and can move one or a plurality of the lenses 210 along an optical axis direction. The lens control instructions can be, for example, zoom control instructions and focus control instructions.

The optical member 230 can be a cover covering an area in front of the plurality of lenses 210. The optical member 230 can be configured from a material having transparency, such as glass or quartz. The optical member 230 can be configured in a plate shape. "Transparency" means having a property of transmitting light. A material having transparency can be a material having a property such that the light transmissivity in the visual spectrum (350 nm to 780 nm) exceeds at least 50%. The optical member 230 can be disposed in front of the lenses 210, which are disposed in the positions farthest from the image sensor 120. A surface of the optical member 230 on the opposite side from the surface facing the image sensor 120 can be exposed to the exterior. The optical member 230 can be disposed in front of the image sensor 120, or can be disposed in any desired position. The optical member 230 can, for example, be disposed between the plurality of lenses 210. The optical member 230 can also be disposed between the plurality of lenses 210 and the image sensor 120.

The heating unit 232 can heat the optical member 230. The heating unit 232 can be configured by a transparent conductive film (ITO). The transparent conductive film can be disposed on one surface of the plate-like optical member 230. The heating unit 232 can be configured by a heating wire that is coiled around the circumference of the optical member 230. The heating unit 232 can also be configured by a heating member other than the ITO and the heating wire.

The optical member 230 can be heated by the heating unit 232. This can prevent water vapor near the optical member 230 from changing into water droplets and adhering to the optical member 230 even when the temperature around the UAV 10 changes in a short amount of time due to the UAV 10 ascending, for example. Specifically, by heating the optical member 230 with the heating unit 232, clouding of the optical member 230 can be prevented even when the temperature around the UAV 10 changes in a short amount of time due to the UAV 10 ascending.

The imaging control unit 110 can include a heating control unit 112. The heating control unit 112 is one example of a control unit for controlling the heating unit 232. Other components such as the lens control unit 220, the UAV control unit 30, or the remote control device 300 can also function as the heating control unit 112.

When the instruction information causing the UAV 10 to increase in altitude fulfills a predetermined condition, the heating control unit 112 can cause the heating unit 232 to heat the optical member 230. When the UAV 10 increases in altitude, the temperature around the UAV 10 is highly likely to change in a short amount of time. When this happens, water droplets can potentially adhere to the inward-facing surface of the optical member 230 due to the difference between the temperature outside the optical member 230 and the temperature inside the housing of the imaging device 100. Given this, when the instruction information causing the UAV 10 to increase in altitude fulfills a predetermined condition, the heating control unit 112 can cause the heating unit 232 to heat the optical member 230 in order to prevent water droplets from adhering to the inward-facing side of the optical member 230. When the instruction information indicates the altitude at which the UAV 10 is to be positioned, the predetermined condition can be a condition that the altitude indicated by the instruction information be at or in excess of a predetermined threshold value. For example, the heating control unit 112 determines that when the altitude indicated by the instruction information received from the remote control device 300 via the communication interface 34 is at or in excess of the predetermined threshold value, for example 100 m, the optical member 230 is highly likely to become clouded. Then, the heating control unit 112 can cause the heating unit 232 to heat the optical member 230. The heating control unit 112 can cause the heating unit 232 to heat the optical member 230 before the altitude of the UAV 10 increases. By doing this, clouding of the optical member 230 can be prevented even when the altitude of the UAV 10 increases and the temperature around the UAV 10 decreases in a short amount of time.

The instruction information can include an ascent command for simply causing the UAV 10 to ascend, without indicating the altitude at which the UAV 10 is to be positioned. In such a case, the UAV 10 can ascend as long as the ascent command is being received. For example, when the UAV 10 continuously receives the ascent command from the remote control device 300, the UAV 10 increases in altitude and the temperature around the UAV 10 is highly likely to decrease in a short amount of time. Given this, the predetermined condition can be a condition that the UAV 10 continuously receive the ascent command for a predetermined period of time or more. When the UAV 10 continuously receives the ascent command from the remote control device 300 for the predetermined period of time, for example three seconds, the heating control unit 112 can determine that the optical member 230 is highly likely to become clouded. Then, the heating control unit 112 can cause the heating unit 232 to heat the optical member 230.

The heating control unit 112 can control the heating unit 232 further based on height information for the UAV 10. The height information can indicate the height of the UAV 10 from a predetermined height. The predetermined height can be a height corresponding to a position the UAV 10 occupies prior to beginning ascent. The predetermined height can also be a height corresponding to a position the UAV 10 occupies over a predetermined period of time. The predetermined height can also be a height corresponding to a position the UAV 10 occupies prior to beginning flight. The predetermined height can also be a height corresponding to a position where the UAV 10 hovers for a predetermined period of time. The heating control unit 112 can determine, based on the height information, timing for stopping the heating of the optical member 230 with the heating unit 232. After the heating control unit 112 begins heating the optical member 230 with the heating unit 232, the heating control unit 112 can cause the heating unit 232 to stop heating the optical member 230 when: the instruction information does not satisfy the predetermined condition; and the difference between the predetermined height and the height indicated by the height information is within a predetermined tolerance The height indicated by the height information can indicate the altitude of the UAV 10. The heating control unit 112 can acquire, via the UAV control unit 30, height information indicating the elevation of the UAV 10 as detected by the barometric altimeter 44. After the heating control unit 112 begins heating the optical member 230 with the heating unit 232, the heating control unit 112 can cause the heating unit 232 to stop heating the optical member 230 when: the instruction information does not satisfy the predetermined condition; and the difference between the predetermined altitude and the altitude of the UAV 10, as indicated by the height information, is within a predetermined tolerance. The predetermined altitude can correspond to the altitude of the UAV 10 prior to the UAV 10 beginning ascent based on the instruction information. The altitude of the UAV 10 prior to the UAV 10 beginning ascent can include an altitude immediately before or immediately after the UAV 10 begins ascent, or an altitude at the point in time when the UAV 10 begins ascent. The predetermined altitude can be the altitude at ground level. The predetermined altitude can also be 0 m. When the UAV 10 performs a movement in which the UAV 10 hovers at a certain altitude then ascends further, the predetermined altitude can be the altitude at the time the UAV 10 is hovering.

The height indicated by the height information can indicate the air pressure around the UAV 10. After the heating control unit 112 begins heating the optical member 230 with the heating unit 232, the heating control unit 112 can cause the heating unit 232 to stop heating the optical member 230 when: the instruction information does not satisfy the predetermined condition; and the difference between the predetermined air pressure and the air pressure around the UAV 10, as indicated by the height information, is within a predetermined tolerance. The predetermined air pressure can correspond to the air pressure around the UAV 10 prior to the UAV 10 beginning ascent based on the instruction information. The air pressure around the UAV 10 prior to the UAV 10 beginning ascent can include an air pressure around the UAV 10 immediately before or immediately after the UAV 10 begins ascent, or an air pressure around the UAV 10 at the point in time when the UAV 10 begins ascent. The predetermined air pressure can be the air pressure at ground level. The predetermined air pressure can be one atmosphere (1013 hPa). When the UAV 10 performs a movement in which the UAV 10 hovers at a certain altitude then ascends further, the predetermined air pressure can be the air pressure around the UAV 10 at the time the UAV 10 is hovering.

The heating control unit 112 can control the heating unit 232 further based on temperature information indicating the temperature around the UAV 10. The heating control unit 112 can acquire, via the UAV control unit 30, temperature information indicating the temperature around the UAV 10 as detected by the temperature sensor 45. The heating control unit 112 can determine, based on the temperature information, timing for stopping the heating of the optical member 230 with the heating unit 232. After the heating control unit 112 begins heating the optical member 230 with the heating unit 232, the heating control unit 112 can cause the heating unit 232 to stop heating the optical member 230 when: the instruction information does not satisfy the predetermined condition; and the difference between the predetermined temperature and the temperature around the UAV 10, as indicated by the temperature information, is within a predetermined tolerance.

The predetermined temperature can correspond to the temperature around the UAV 10 prior to the UAV 10 beginning ascent based on the instruction information. The temperature around the UAV 10 prior to the UAV 10 beginning ascent can include a temperature around the UAV 10 immediately before or immediately after the UAV 10 begins ascent, or a temperature around the UAV 10 at the point in time when the UAV 10 begins ascent. The predetermined temperature can be the temperature at ground level. When the UAV 10 performs a movement in which the UAV 10 hovers at a certain altitude then ascends further, the predetermined temperature can be the temperature around the UAV 10 at the time the UAV 10 is hovering.

Figure 3:
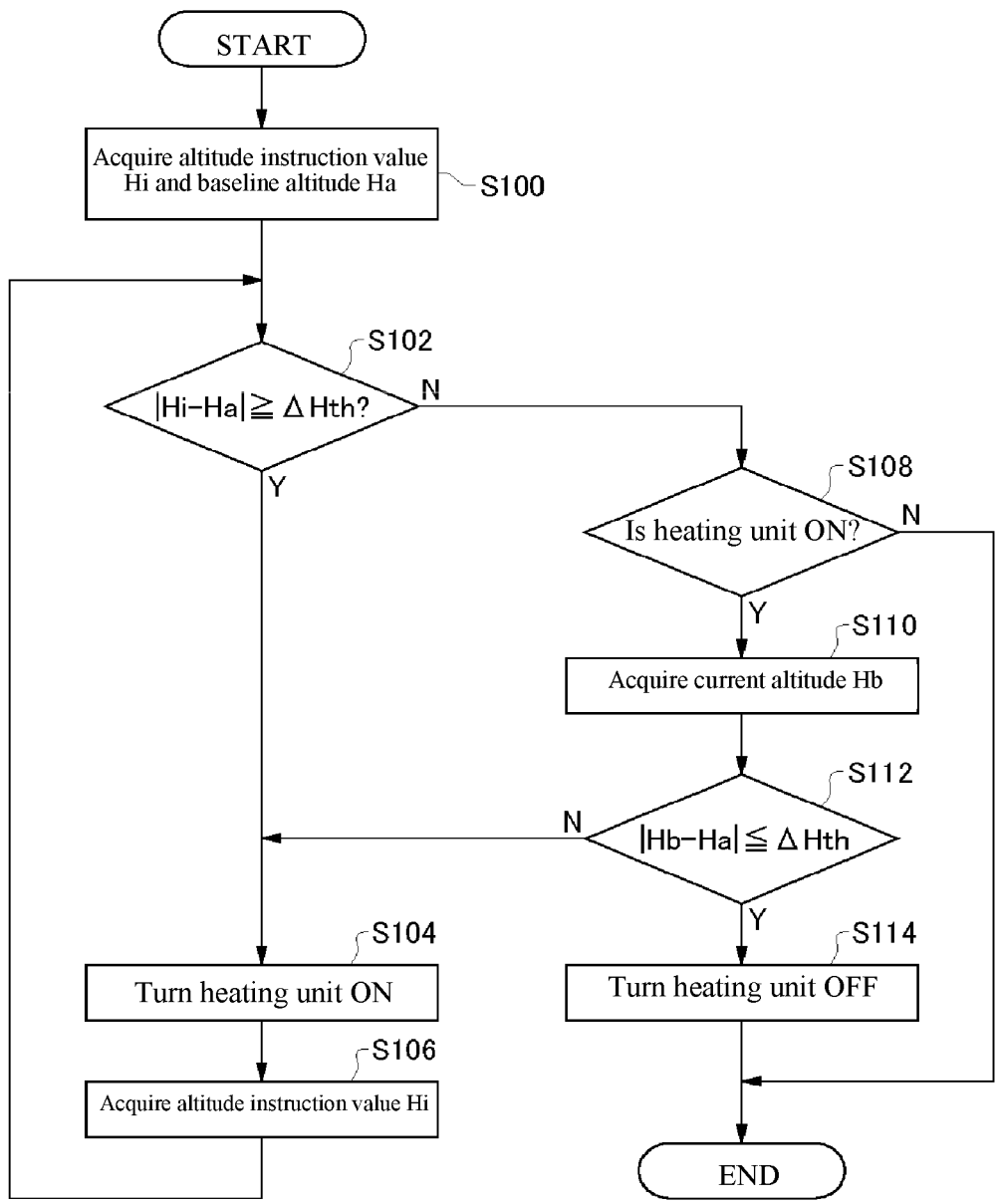
FIG. 3 is a flowchart illustrating one example of a procedure for controlling a heating unit with a heating control unit.

FIG. 3 is a flowchart illustrating one example of a procedure for controlling the heating unit 232 with the heating control unit 112. The heating control unit 112 can reference the instruction information the UAV 10 receives from the remote control device 300 and can acquire an altitude instruction value Hi indicating the altitude at which the UAV 10 is to be positioned. The heating control unit 112 can further acquire, via the UAV control unit 30, the current altitude detected by the barometric altimeter 44 as a baseline altitude Ha (S100). The heating control unit 112 can determine whether the difference between the altitude instruction value Hi and the baseline altitude Ha is equal to or greater than a predetermined threshold value ΔHth (S102). When the difference is equal to or greater than the threshold value ΔHth, the heating control unit 112 can turn the heating unit 232 ON and cause the optical member 230 to be heated by the heating unit 232 (S104). Next, the heating control unit 112 can once again acquire the altitude instruction value Hi indicated by the instruction information received from the remote control device 300 (S106). When the UAV control unit 30 receives the instruction information from the remote control device 300, the UAV control unit 30 can store the altitude instruction value Hi, indicated by the received instruction information, in the memory 32 as the altitude at which the UAV 10 is to be positioned. The UAV control unit 30 can reference the altitude instruction value Hi stored in the memory 32 and can control the flight of the UAV 10. The UAV control unit 30 can refresh the altitude instruction value stored in the memory 32 each time a new altitude instruction value Hi is received from the remote control device 300. Accordingly, the heating control unit 112 can retrieve the altitude instruction values stored in the memory 32 as they are received, and can calculate difference of each relative to the baseline altitude Ha in turn.

When the difference is less than the threshold value ΔHth, the heating control unit 112 can determine whether the heating unit 232 is ON (S108). In other words, the heating control unit 112 can determine whether the heating unit 232 is heating the optical member 230. When the heating unit 232 is not ON, the heating control unit 112 can end the process. However, when the heating unit 232 is ON, the heating control unit 112 can next acquire a current altitude Hb of the area around the UAV 10 (S110). The heating control unit 112 can determine whether the difference between the current altitude Hb and the baseline altitude Ha is equal to or less than the predetermined threshold value ΔHth (S112). The threshold value ΔHth used in the determination of step S102 and the threshold value ΔHth used in the determination of step S112 can be identical, or can be different.

When the result of the determination is that the difference no more than the threshold value ΔHth, the heating control unit 112 can turn the heating unit 232 OFF (S114). In other words, the heating control unit 112 can stop the heating of the optical member 230 by the heating unit 232. However, when the result of the determination is that the difference is greater than the threshold value ΔHth, the heating control unit 112 can leave the heating unit 232 ON. In other words, the heating control unit 112 can continue the heating of the optical member 230 by the heating unit 232.

As noted above, the heating control unit 112 can determine whether the temperature around the UAV 10 is highly likely to decrease in a short amount of time, based on the altitude instruction value. In addition, when the heating control unit 112 determines that the temperature around the UAV 10 is highly likely to decrease in a short amount of time, the heating control unit 112 can heat the optical member 230 with the heating unit 232 in advance, before a significant temperature change occurs. Clouding of the optical member 230 can thereby be prevented.

Figure 4:
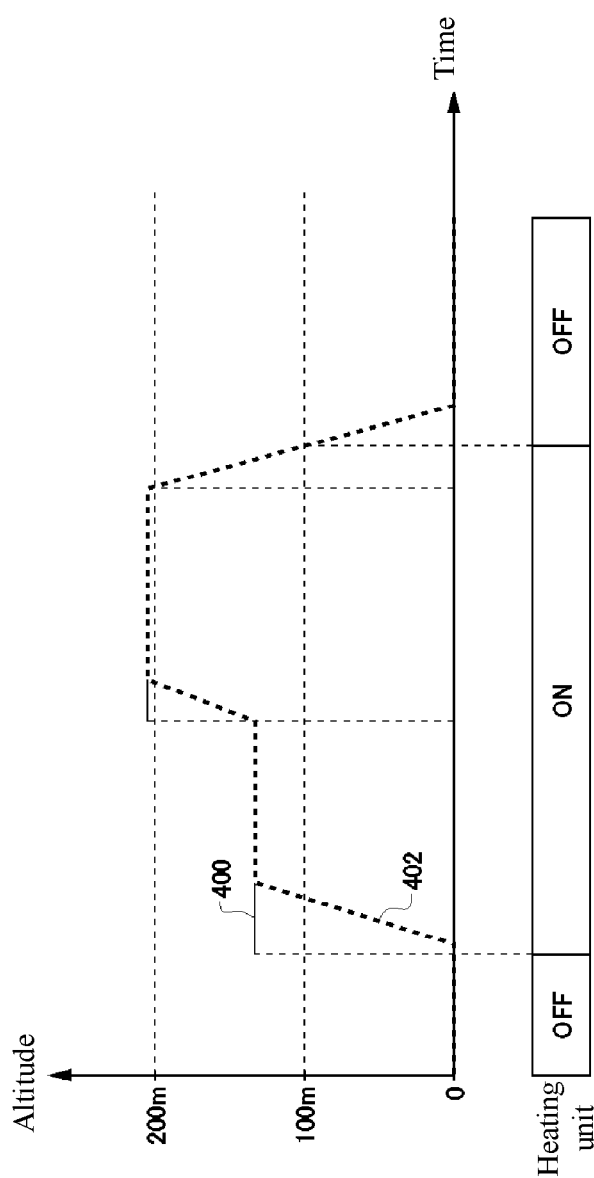
FIG. 4 illustrates one example of timing for turning the heating unit ON and OFF.

FIG. 4 illustrates an example of the timing for turning the heating unit 232 ON and OFF. The solid line 400 indicates the altitude instruction value. The dashed line 402 indicates the altitude of the UAV 10 as detected by the barometric altimeter 44. When the altitude instruction value is 0 m, the heating unit 232 can remain OFF. Thereafter, when the UAV 10 receives from the remote control device 300 an altitude instruction value indicating an altitude of 100 m or more, the heating control unit 112 can turn the heating unit 232 ON. Even after the altitude of the UAV 10 reaches the altitude instruction value, the heating unit 232 can remain ON. A case is considered where the UAV 10 thereafter receives a descent command from the remote control device 300. When this occurs, the altitude of the UAV 10 reaches an altitude of 100 m or less, which is the threshold value. At this stage, the heating control unit 112 determines that the difference in temperature from ground level is slight, and the heating control unit 112 turns the heating unit 232 OFF.

Figure 5:
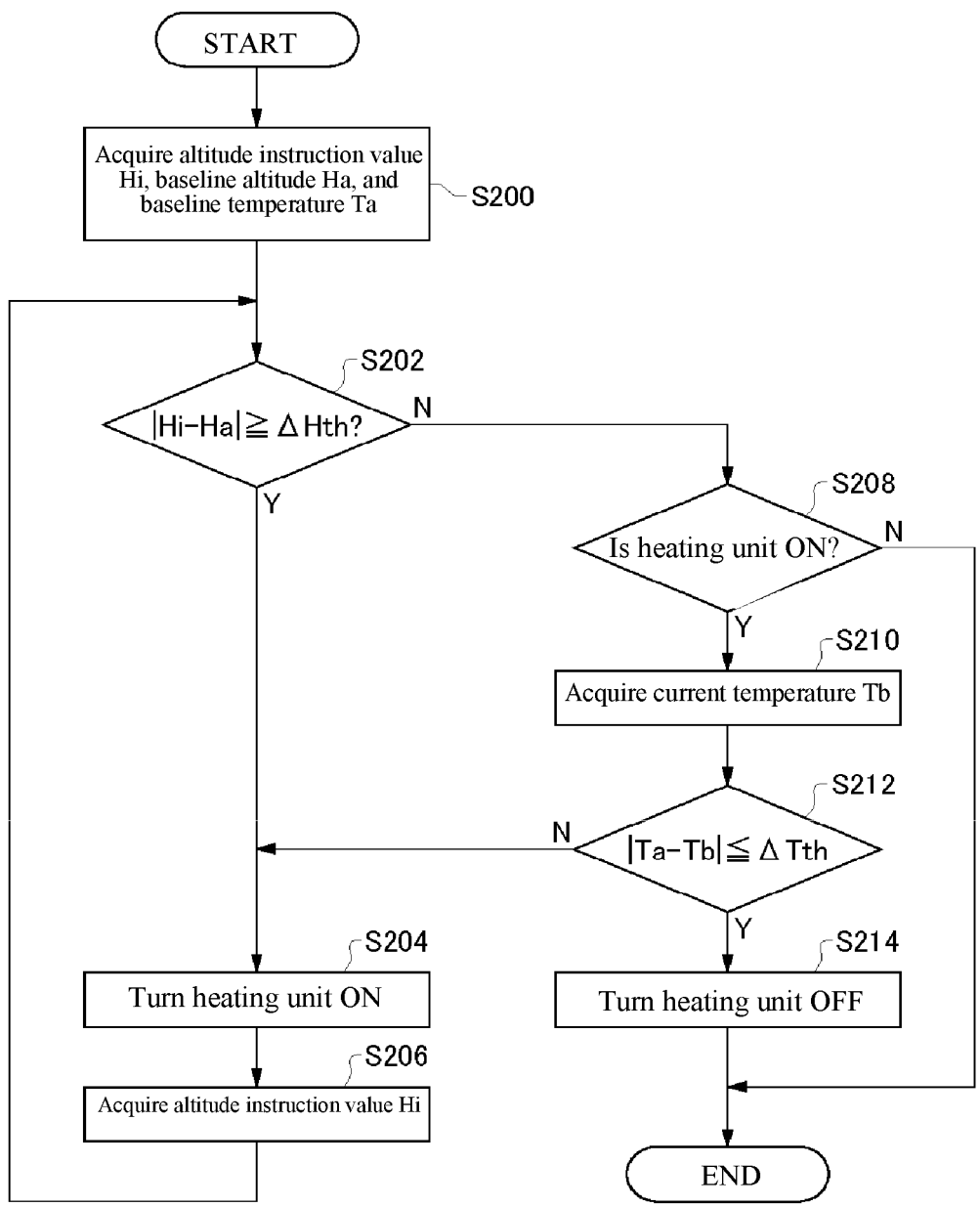
FIG. 5 is a flowchart illustrating another example of a procedure for controlling the heating unit with the heating control unit.

FIG. 5 is a flowchart illustrating another example of a procedure for controlling the heating unit 232 with the heating control unit 112. The flowchart of FIG. 5 differs from the flowchart of FIG. 3 in that, in FIG. 5, the timing at which the heating unit 232 is turned OFF is determined based on the temperature around the UAV 10.

The heating control unit 112 can reference the instruction information the UAV 10 receives from the remote control device 300 and can acquire the altitude instruction value Hi indicating the altitude at which the UAV 10 is to be positioned. The heating control unit 112 can further acquire, via the UAV control unit 30, the current altitude detected by the barometric altimeter 44 as the baseline altitude Ha. In addition, the heating control unit 112 can further acquire, via the UAV control unit 30, the current temperature around the UAV 10 detected by the temperature sensor 45 as a baseline temperature Ta (S200). The heating control unit 112 can determine whether the difference between the altitude instruction value Hi and the baseline altitude Ha is equal to or greater than the predetermined threshold value $\Delta$Hth (S202). When the difference is equal to or greater than the threshold value $\Delta$Hth, the heating control unit 112 can turn the heating unit 232 ON and cause the optical member 230 to be heated by the heating unit 232 (S204). Next, the heating control unit 112 can once again acquire the altitude instruction value Hi indicated by the instruction information received from the remote control device 300 (S206).

When the difference is less than the threshold value $\Delta$Hth, the heating control unit 112 can determine whether the heating unit 232 is ON (S208). In other words, the heating control unit 112 can determine whether the heating unit 232 is heating the optical member 230. When the heating unit 232 is not ON, the heating control unit 112 can end the process. However, when the heating unit 232 is ON, the heating control unit 112 can next acquire a current temperature Tb of the area around the UAV 10 (S210). The heating control unit 112 can determine whether the difference between the current temperature Tb and the baseline temperature Ta is equal to or less than a predetermined threshold value $\Delta$Tth (S212).

When the result of the determination is that the difference is no more than the threshold value $\Delta$Tth, the heating control unit 112 can turn the heating unit 232 OFF (S214). In other words, the heating control unit 112 can stop the heating of the optical member 230 by the heating unit 232. However, when the result of the determination is that the difference is greater than the threshold value $\Delta$Tth, the heating control unit 112 can leave the heating unit 232 ON. In other words, the heating control unit 112 can continue the heating of the optical member 230 by the heating unit 232.

Figure 6:
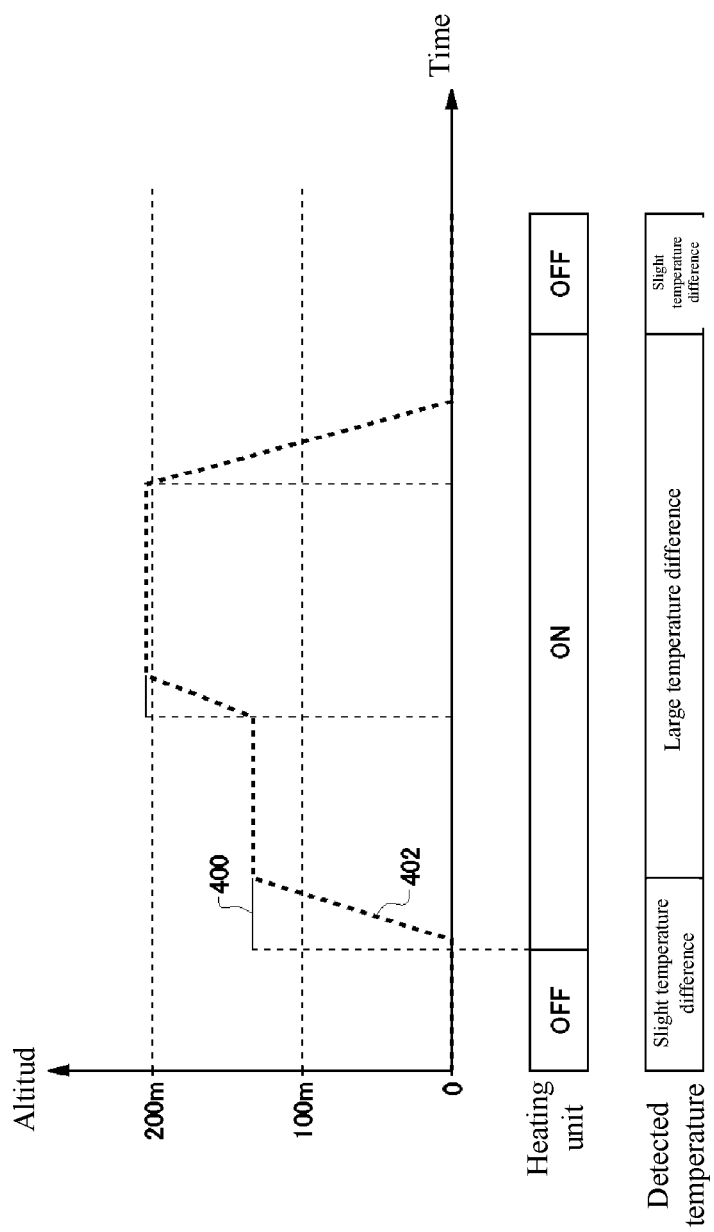
FIG. 6 illustrates another example of timing for turning the heating unit ON and OFF.

FIG. 6 illustrates another example of the timing for turning the heating unit 232 ON and OFF. The solid line 400 indicates the altitude instruction value. The dashed line 402 indicates the altitude of the UAV 10 as detected by the barometric altimeter 44. When the altitude instruction value is 0 m, the heating unit 232 can remain OFF. Thereafter, when the UAV 10 receives from the remote control device 300 an altitude instruction value indicating an altitude of 100 m or more, the heating control unit 112 can turn the heating unit 232 ON even when there is no, or only a slight, difference relative to the baseline temperature. Even after the altitude of the UAV 10 reaches the altitude instruction value, the heating unit 232 can remain ON. A case is considered where the UAV 10 thereafter receives a descent command from the remote control device 300. In such a case, when there is a large difference in temperature even when the altitude instruction value is 0 m and the actual altitude of the UAV 10 is 0 m, the heating control unit 112 can continue the heating of the optical member 230 by the heating unit 232. Thereafter, when the difference between the temperature around the UAV 10 as detected by the temperature sensor 45 and the baseline temperature becomes smaller, the heating control unit 112 can turn the heating unit 232 OFF.

Figure 7:
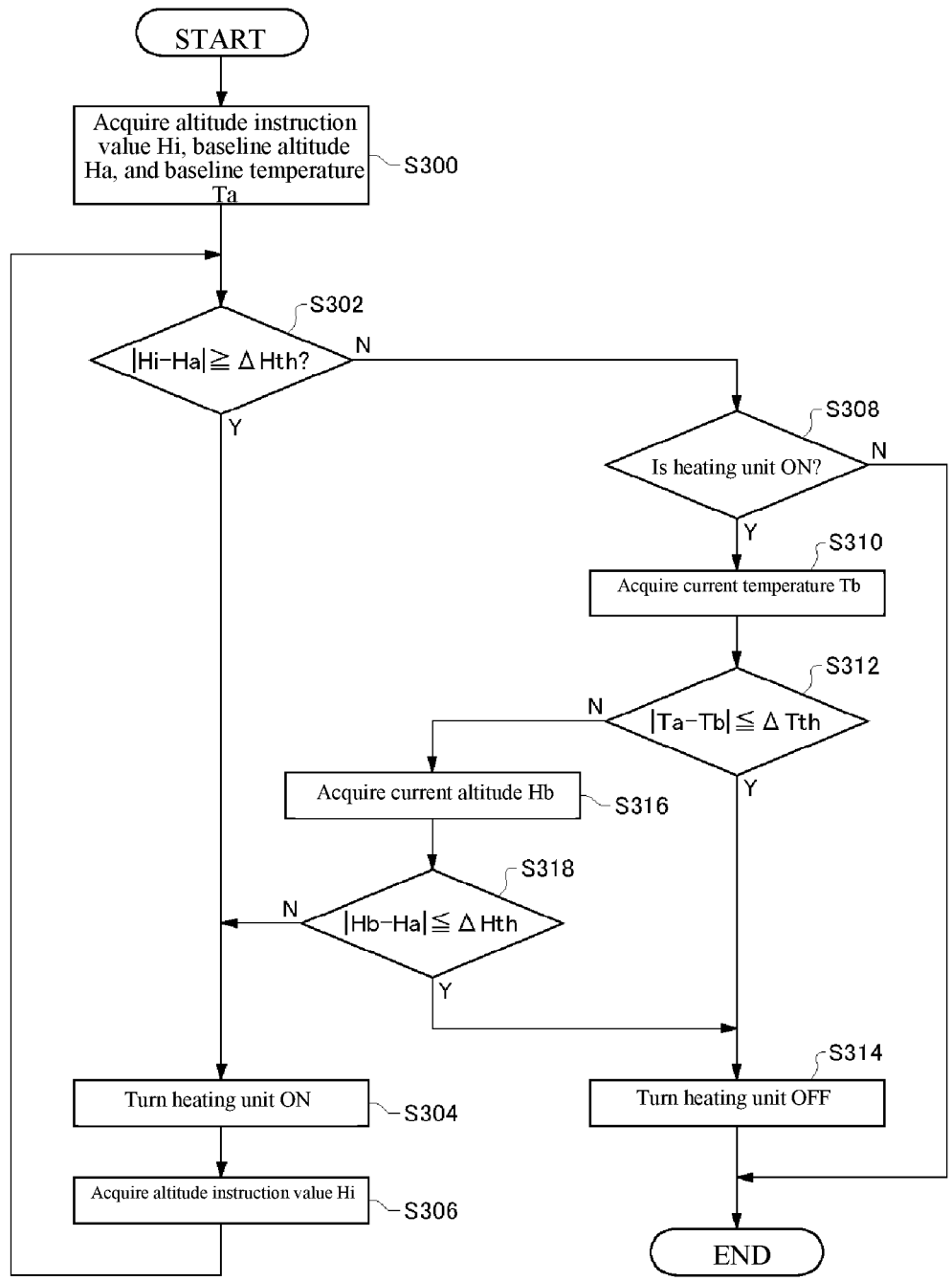
FIG. 7 is a flowchart illustrating another example of a procedure for controlling the heating unit with the heating control unit.

FIG. 7 is a flowchart illustrating another example of a procedure for controlling the heating unit 232 with the heating control unit 112. The flowchart of FIG. 7 differs from the flowcharts of FIGS. 3 and 5 in that, in FIG. 7, the timing at which the heating unit 232 is turned OFF is determined based on the altitude and temperature around the UAV 10.

The heating control unit 112 can reference the instruction information the UAV 10 receives from the remote control device 300 and can acquire the altitude instruction value Hi indicating the altitude at which the UAV 10 is to be positioned. The heating control unit 112 can further acquire, via the UAV control unit 30, the current altitude detected by the barometric altimeter 44 as the baseline altitude Ha. In addition, the heating control unit 112 can further acquire, via the UAV control unit 30, the current temperature around the UAV 10 detected by the temperature sensor 45 as the baseline temperature Ta (S300). The heating control unit 112 can determine whether the difference between the altitude instruction value Hi and the baseline altitude Ha is equal to or greater than the predetermined threshold value $\Delta$Hth (S302). When the difference is equal to or greater than the threshold value $\Delta$Hth, the heating control unit 112 can turn the heating unit 232 ON and cause the optical member 230 to be heated by the heating unit 232 (S304). Next, the heating control unit 112 can once again acquire the altitude instruction value Hi indicated by the instruction information received from the remote control device 300 (S306).

When the difference is less than the threshold value $\Delta$Hth, the heating control unit 112 can determine whether the heating unit 232 is ON (S308). In other words, the heating control unit 112 can determine whether the heating unit 232 is heating the optical member 230. When the heating unit 232 is not ON, the heating control unit 112 can end the process. However, when the heating unit 232 is ON, the heating control unit 112 can next acquire the current temperature Tb of the area around the UAV 10 (S310). The heating control unit 112 can determine whether the difference between the current temperature Tb and the baseline temperature Ta is equal to or less than the predetermined threshold value ΔTth (S312).

When the result of the determination is that the difference is no more than the threshold value ΔTth, the heating control unit 112 can turn the heating unit 232 OFF (S314). In other words, the heating control unit 112 can stop the heating of the optical member 230 by the heating unit 232. However, when the result of the determination is that the difference is greater than the threshold value ΔTth, the heating control unit 112 can acquire the current altitude Hb of the UAV 10 (S316). The heating control unit 112 can determine whether the difference between the current altitude Hb and the baseline altitude Ha is equal to or less than the predetermined threshold value ΔHth (S318).

When the result of the determination is that the difference is no more than the threshold value ΔHth, the heating control unit 112 can turn the heating unit 232 OFF (S314). In other words, the heating control unit 112 can stop the heating of the optical member 230 by the heating unit 232. However, when the result of the determination is that the difference is greater than the threshold value ΔHth, the heating control unit 112 can leave the heating unit 232 ON (S304). In other words, the heating control unit 112 can continue the heating of the optical member 230 by the heating unit 232. The heating control unit 112 can continue the heating of the optical member 230 by the heating unit 232 until the difference in temperature is no more than the threshold value ΔTth, or until the difference in altitude is no more than the threshold value ΔHth.

As noted above, according to the imaging device 100 according to the present embodiment, when the instruction information causing the UAV 10 to ascend fulfills the predetermined condition, a determination can be made that the temperature around the UAV 10 is highly likely to decrease in a short amount of time. In addition, when the heating control unit 112 determines that the temperature around the UAV 10 is highly likely to decrease in a short amount of time, the heating control unit 112 can heat the optical member 230 with the heating unit 232 in advance, before a significant temperature change occurs. Clouding of the optical member 230 can thereby be prevented.

Figure 8:
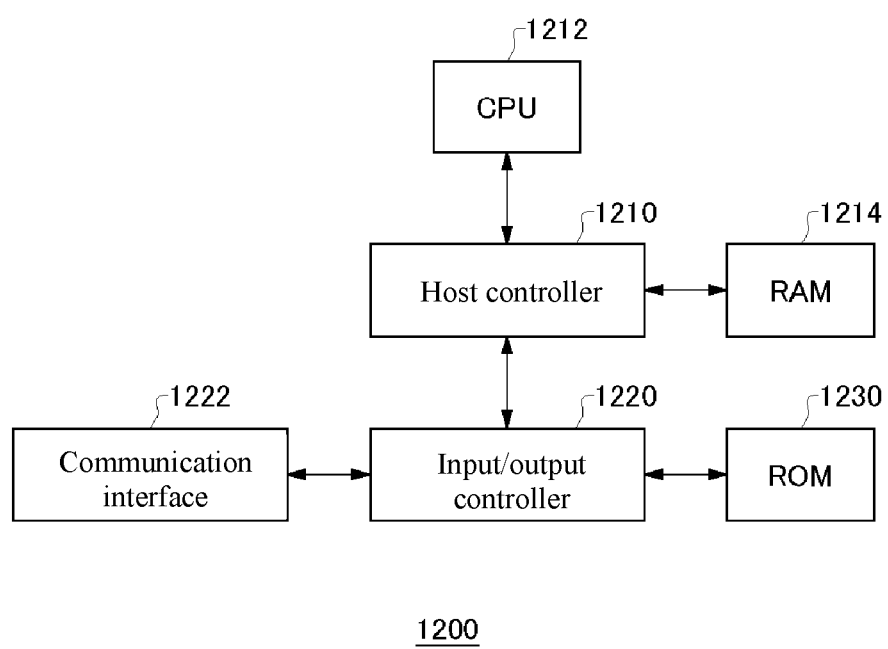
FIG. 8 illustrates one example of a hardware configuration.

FIG. 8 illustrates one example of a computer 1200 that can entirely or partially realize a plurality of aspects of the present disclosure. A program installed on the computer 1200 can cause the computer 1200 to function as operations related to devices according to an embodiment of the present disclosure, or as one or a plurality of "units" of the devices. Alternatively, the program can cause the computer 1200 to execute the operations or the one or plurality of "units." The program can cause the computer 1200 to execute a process or the steps of a process according to an embodiment of the present disclosure. Such a program can cause the computer 1200 to execute specific operations related to some or all of the blocks of the flowcharts and block diagrams described in the present specification by executing the program via a CPU 1212.

The computer 1200 according to the present embodiment can include the CPU 1212 and a RAM 1214, and these can be mutually connected by a host controller 1210. The computer 1200 can further include a communication interface 1222 and an input/output unit, and these can be connected to the host controller 1210 via an input/output controller 1220. The computer 1200 can further include a ROM 1230. The CPU 1212 can act in accordance with a program stored in the ROM 1230 and the RAM 1214, and can control each unit thereby.

The communication interface 1222 can communicate with other electronic devices via the network. A hard disc drive can store the programs and data to be used by the CPU 1212 of the computer 1200. The ROM 1230 can store therein boot programs and the like that are executed by the computer 1200 during activation and/or programs that depend on hardware of the computer 1200. The programs can be provided via a computer-readable recording medium like a CD-ROM, USB memory, or an IC card, or via a network. The programs can be installed on the RAM 1214 or the ROM 1230, which are examples of a computer-readable recording medium, and can be executed by the CPU 1212. The information processes written in these programs can be read by the computer 1200, and can bring about the coordination between the programs and the various types of hardware resources described above. Devices or methods can be configured by the manipulation or processing of information achieved through use of the computer 1200.

For example, when communication is carried out between the computer 1200 and an external device, the CPU 1212 can execute a communication program loaded in the RAM 1214, and can instruct the communication interface 1222 to perform communication processes based on the processes written in the communication program. Under the control of the CPU 1212, the communication interface 1222 can read sending data stored in a sending buffer region provided on a recording medium such as the RAM 1214 or USB memory, and can send the read sending data to the network, or can write receiving data received from the network to a receiving buffer region or the like provided on the recording medium.

Further, the CPU 1212 can make the entirety or necessary portions of files or a database stored on an external recording medium such as USB memory be read by the RAM 1214, and can execute a variety of types of processes on the data that is on the RAM 1214. The CPU 1212 then writes back the processed data to the external recording medium.

A variety of types of programs and a variety of types of information like data, tables, and databases can be stored on the recording medium and can accept information processing. The CPU 1212 can execute, on data read from the RAM 1214, a variety of types of processes designated by an instruction sequence of the program and described throughout the present disclosure, and can write back the results to the RAM 1214. The variety of types of processes can include a variety of types of operations, information processing, condition determination, conditional branching, unconditional branching, information search/replace, and the like. Further, the CPU 1212 can search the information in the files, databases, and the like on the recording medium. For example, a plurality of entries can be stored on the recording medium. Each of the plurality of entries can have an attribute value of a first attribute that is related to an attribute value of a second attribute. When the plurality of entries are stored on the recording medium, the CPU 1212 can search among the plurality of entries for an entry that matches the search conditions and has a designated attribute value for the first attribute. The CPU 1212 can then read the attribute value of the second attribute stored in the entry, and can thereby acquire the attribute value of the second attribute that is related to the first attribute that fulfills preset conditions.

The program or software module described above can be stored on the computer 1200 or on a computer-readable recording medium near the computer 1200. Further, a recording medium like a hard disc or RAM provided in a server system connected to a private communications network or the Internet can be used as the computer-readable recording medium, and the program can thereby be provided to the computer 1200 via the network.

The order of each process in the operations, procedures, steps, stages, and the like of the devices, systems, programs, and methods in the scope of the claims, specification, and drawings is not specifically disclosed using "beforehand," "in advance," and the like, and any order is possible as long as a postprocess does not use the output of a preprocess. Even if "first," "next," and the like are used for convenience in describing the flow of operations in the scope of the claims, specification, and drawings, it is not meant that it must be executed in this order.

DESCRIPTION OF REFERENCE NUMERALS

10 Unmanned aerial vehicle (UAV)
20 UAV body
30 UAV control unit
32 Memory
34 Communication interface
40 Propulsion unit
41 GPS receiver
42 Inertial measurement unit (IMU)
43 Magnetic compass
44 Barometric altimeter
45 Temperature sensor
50 Gimbal
60 Imaging device
100 Imaging device
102 Imaging unit
110 Imaging control unit
112 Heating control unit
120 Image sensor
130 Memory
200 Lens unit
210 Lens
212 Lens movement mechanism
220 Lens control unit
230 Optical member
232 Heating unit
300 Remote control device
1200 Computer
1210 Host controller
1212 CPU
1214 RAM
1220 Input/output controller
1222 Communication interface
1230 ROM

What is claimed is:

1. A control device comprising:
control circuitry configured to:
control a heating device to heat an optical member in response to instruction information fulfilling a predetermined condition;
wherein:
the instruction information causes an increase in altitude of a movable object and indicates a target altitude at which the movable object is to be positioned;
the predetermined condition includes that the target altitude equals or is larger than a predetermined threshold value;
the movable object includes an imaging device that includes an image sensor, the optical member, and the heating device; and
the optical member is arranged in front of the image sensor.

2. The control device of claim 1, wherein:
the instruction information includes an ascent command for causing the movable object to ascend; and
the predetermined condition further includes that the movable object continuously receives the ascent command for at least a predetermined period of time.

3. The control device of claim 1, wherein the control circuitry is further configured to control the heating device further based on height information for the movable object.

4. The control device of claim 3, wherein:
the height information indicates a height of the movable object; and
the control circuitry is further configured to, after starting to control the heating device to heat the optical member, control the heating device to stop heating the optical member in response to the instruction information no longer satisfying the predetermined condition and a difference between a predetermined height and the height of the movable object being within a predetermined tolerance.

5. The control device of claim 3, wherein:
the height information indicates an altitude of the movable object; and
the control circuitry is further configured to, after starting to control the heating device to heat the optical member, control the heating device to stop heating the optical member in response to the instruction information no longer satisfying the predetermined condition and a difference between a predetermined altitude and the altitude of the movable object being within a predetermined tolerance.

6. The control device of claim 5, wherein the predetermined altitude corresponds to the altitude of the movable object prior to the movable object beginning to ascend based on the instruction information.

7. The control device of claim 3, wherein:
the height information indicates an air pressure around the movable object; and
the control circuitry is further configured to, after starting to control the heating device to heat the optical member, control the heating device to stop heating the optical member in response to the instruction information no longer satisfying the predetermined condition and a difference between a predetermined air pressure and the air pressure around the movable object being within a predetermined tolerance.

8. The control device of claim 7, wherein the predetermined air pressure corresponds to the air pressure around the movable object prior to the movable object beginning to ascend based on the instruction information.

9. The control device of claim 1, wherein the control circuitry is further configured to control the heating device further based on temperature information indicating a temperature around the movable object.

10. The control device of claim 9, wherein the control circuitry is further configured to, after starting to control the heating device to heat the optical member, control the heating device to stop heating the optical member in response to the instruction information no longer satisfying the predetermined condition and a difference between a predetermined temperature and the temperature around the movable object being within a predetermined tolerance.

11. The control device of claim 10, wherein the predetermined temperature corresponds to the temperature around the movable object prior to the movable object beginning to ascend based on the instruction information.

12. The control device of claim 1, wherein:
the imaging device includes at least one lens provided between the optical member and the image sensor; and
the optical member covers an area in front of the at least one lens.

13. A lens device comprising:
the control device of claim 1;
the optical member;
at least one lens between the optical member and the image sensor, the optical member covering an area in front of the at least one lens; and
the heating device.

14. An imaging device comprising:
an image sensor;
an optical member arranged in front of the image sensor;
at least one lens between the optical member and the image sensor, the optical member covering an area in front of the at least one lens;
a heating device; and
a control device including control circuitry configured to control the heating device to heat the optical member in response to instruction information fulfilling a predetermined condition, the instruction information causing an increase in altitude of a movable object carrying the imaging device and indicating a target altitude at which the movable object is to be positioned, and the predetermined condition including that the target altitude equals or is larger than a predetermined threshold value.

15. The imaging device of claim 14, wherein the control circuitry is further configured to control the heating device further based on height information for the movable object.

16. An imaging system comprising:
the imaging device of claim 14; and
a carrier supporting the imaging device.

17. The imaging system of claim 16, wherein the control circuitry is further configured to control the heating device further based on height information for the movable object.

18. A movable object comprising:
a propulsion system;
an imaging device including:
an image sensor;
an optical member arranged in front of the image sensor;
at least one lens between the optical member and the image sensor, the optical member covering an area in front of the at least one lens;
a heating device; and
a control device including control circuitry configured to control the heating device to heat the optical member in response to instruction information fulfilling a predetermined condition, the instruction information causing an increase in altitude of a movable object carrying the imaging device and indicating a target altitude at which the movable object is to be positioned, and the predetermined condition including that the target altitude equals or is larger than a predetermined threshold value; and
a carrier supporting the imaging device.

19. The movable object of claim 18, wherein the control circuitry is further configured to control the heating device further based on height information for the movable object.

* * * * *